United States Patent
Baburao et al.

(10) Patent No.: US 8,460,436 B2
(45) Date of Patent: Jun. 11, 2013

(54) ADVANCED INTERCOOLING AND RECYCLING IN $CO_2$ ABSORPTION

(75) Inventors: Barath Baburao, Knoxville, TN (US); Craig Schubert, Lake Jackson, TX (US)

(73) Assignees: Alstom Technology Ltd, Baden (CH); Dow Global Technologies LLC, Midland, MI (US)

( * ) Notice: Subject to any disclaimer, the term of this patent is extended or adjusted under 35 U.S.C. 154(b) by 746 days.

(21) Appl. No.: 12/625,051

(22) Filed: Nov. 24, 2009

(65) Prior Publication Data

US 2011/0120309 A1     May 26, 2011

(51) Int. Cl.
*B01D 53/14* (2006.01)

(52) U.S. Cl.
USPC .................. 95/187; 95/199; 95/223; 95/228; 95/235; 95/236

(58) Field of Classification Search
None
See application file for complete search history.

(56) References Cited

U.S. PATENT DOCUMENTS

| | | | |
|---|---|---|---|
| 2,487,576 A | 11/1949 | Meyers | |
| 2,608,461 A | 8/1952 | Frazier | |
| 3,255,233 A | 6/1966 | Kunze et al. | |
| 3,563,696 A | 2/1971 | Benson | |
| 3,896,212 A | 7/1975 | Eickmeyer | |
| 5,378,442 A * | 1/1995 | Fujii et al. | 423/228 |
| 6,800,120 B1 | 10/2004 | Won et al. | |
| 2004/0226441 A1* | 11/2004 | Palmer | 95/235 |
| 2008/0072762 A1 | 3/2008 | Gal | |
| 2011/0067567 A1* | 3/2011 | Kozak et al. | 95/187 |
| 2011/0120308 A1* | 5/2011 | Dube et al. | 95/199 |

FOREIGN PATENT DOCUMENTS

| | | |
|---|---|---|
| EP | 0 502 596 | 9/1992 |
| EP | 1 695 756 | 8/2006 |
| GB | 871207 | 6/1961 |
| WO | 2004/005818 | 1/2004 |
| WO | 2005/069965 | 8/2005 |
| WO | 2007/019632 | 2/2007 |
| WO | 2007/107004 | 9/2007 |
| WO | WO 2008094777 | 8/2008 |

OTHER PUBLICATIONS

PCT International Search Report and The Written Opinion of the International Searching Authority, dated Dec. 20, 2010—(PCT/US2010/052604).

* cited by examiner

*Primary Examiner* — Duane Smith
*Assistant Examiner* — Pankti Patel
(74) *Attorney, Agent, or Firm* — McNees Wallace & Nurick LLC

(57) ABSTRACT

The present invention relates processes of removal of acidic gases from a gas stream, comprising the steps of
a) contacting a wash solution stream with said gas stream containing acidic gases to be removed to allow absorption of the acidic gases into the wash solution stream;
b) withdrawing wash solution enriched with acidic gases from said wash solution stream at a first withdrawal level;
c) cooling said withdrawn wash solution; and
d) reintroducing said cooled wash solution to the wash solution stream at a first reintroduction level to form a mixed wash solution stream, said first reintroduction level being upstream of said first withdrawal level.

The present invention also relates to systems for removal of acidic gases from a gas stream.

13 Claims, 3 Drawing Sheets

ADVANCED INTERCOOLING AND RECYCLING IN $CO_2$ ABSORPTION

FIELD OF THE INVENTION

The present invention relates to methods and systems for removal of acidic gases, such as $CO_2$ and $H_2S$, from gas streams.

BACKGROUND

Various methods are known in the art to remove an undesired gaseous component from a process gas stream. In processes used for industrial separation of acidic components such as $H_2S$, $CO_2$, COS and/or mercaptans from a gas stream such as flue gas, natural gas, syngas or other gas streams mainly containing nitrogen, oxygen, hydrogen, carbon monoxide and/or methane, liquid solutions comprising amine compounds or aqueous ammonia solutions are commonly used as a solvent. The acidic components are absorbed in the solvent in an absorption process, commonly performed in an absorption unit such as a packed bed column.

After removal of acidic components, the purified gas stream leaves the absorption unit for further processing or for discharge. The solvent containing the absorbed acidic components is generally heated in a heat exchanger and separated from the acidic components in a regenerator. This separation is generally referred to as "stripping". After stripping, the solvent may be sent back to the absorption unit via a heat exchanger to reduce the temperature of the solvent entering the absorption unit. Thus, the system process comprising an absorption unit and a regenerator allows continuous operation of removal of acidic components from a gas stream.

U.S. Pat. No. 6,645,446 discloses a split-flow process for removing a gaseous component, such as $CO_2$, from a process gas stream. The process comprises combining semi-rich solvent coming from an upper section of an absorber with semi-lean solvent from a regenerator to form a mixed solvent stream. The mixed solvent stream is subsequently fed to the lower section of the absorber.

Although various improvements of conventional gas purification technologies are known, there is an ever-existing desire to further improve these technologies, e.g. in respect of purification efficacy and energy consumption.

SUMMARY OF THE INVENTION

An object of the present invention is to improve conventional amine-based technologies for acidic gas capture.

Accordingly, and depending on the operational and design parameters of a known technology for capture of acidic gases, an object may reside in the reduction of energy and/or chemical consumption.

Furthermore, an object may reside in the environmental, health and/or economical improvements of reduced emission of chemicals used in such a technology for acid gas absorption.

In one aspect, the above-mentioned objects as well as further objects, which will become apparent to a skilled man after studying the description below, will be achieved by a process of removal of acidic gases from a gas stream, comprising the steps of a) contacting a wash solution stream with said gas stream containing acidic gases to be removed to allow absorption of the acidic gases into the wash solution stream;

b) withdrawing wash solution enriched with acidic gases from said wash solution stream at a first withdrawal level;

c) cooling said withdrawn wash solution; and d) reintroducing said cooled wash solution to the wash solution stream at a first reintroduction level to form a mixed wash solution stream, said first reintroduction level being upstream of said first withdrawal level.

The term "gas stream" as used herein should be understood as any gas stream, such as flue gas or natural gas, containing undesired acidic gas components. It is to be understood that the inventive removal process is equally suitable for removal of any acidic gas, such as $CO_2$, $H_{2S}$ and COS. The inventive process may for example be used for removal of $CO_2$ from a gas stream.

The term "wash solution", as used herein, refers generally to an aqueous medium used for removal of acidic gases from a gas stream by bringing said gas stream into contact with a stream of said wash solution, resulting in the absorption of acidic gases from said gas stream into said wash solution stream. The wash solution stream containing the absorbed acidic gases is generally recycled, e.g. "stripped" in a regenerator, to produce a regenerated, "lean" wash solution, which may be reused for absorption of acidic gases.

The term "level", as used herein, refers generally to a position of the wash solution stream in relation to another position of the wash solution stream. Thus, a first level may be upstream or downstream a second level. The term "withdrawal level" refers to any position of the wash solution stream from where wash solution enriched with acidic gases may be withdrawn. Similarly, the term "reintroduction level" refers to any position where wash solution can be reintroduced to the wash solution stream and contacted with a gas stream containing acidic gases.

The process according to the first aspect provides incremented absorption of acidic gases in a wash solution stream as compared to a conventional amine-based process for acidic gas removal. First, a wash solution stream is contacted with a gas stream comprising acidic gases to be removed. Absorption of acidic gases into said wash solution stream provides a wash solution stream enriched with acidic gases, called the rich solution. Subsequently, wash solution enriched with acidic gases is withdrawn from said wash solution stream and cooled. Thereafter, the cooled wash solution is reintroduced to and mixed with the wash solution stream at a position upstream of the withdrawal position. Thus, said steps enable a shift in the absorption equilibrium and a prolonged contact time for contacting the withdrawn wash solution with a gas stream containing acidic gases. The absorption equilibrium is shifted in that the withdrawn wash solution is cooled and once again brought into contact with a gas stream containing acidic gases, which allows said withdrawn and reintroduced wash solution to absorb more acidic gases. Thus, the process as described above provides an increased loading, i.e. increased absorption in moles of acidic gases per moles of wash solution, as compared to a conventional process. It was moreover found that even a small increase in the rich loading downstream of the absorption unit has a significant impact on the energy consumption. For example, in a process as generally represented by FIG. 3, wherein 50% of the wash stream solution coming out of the absorption unit is cooled and recycled to a bottom section of the absorption unit to allow for continued absorption of acidic gases, the loading is increased by approximately 7% and the overall energy consumption is reduced by approximately 5% as compared to a conventional process.

In step b) of the inventive process, said wash solution withdrawn from the first withdrawal level may constitute a fraction of the total wash solution stream. The ratio of withdrawn wash solution may be 10-90% of the total wash solution stream, such as 30-70% of the total wash solution stream. The withdrawal of wash solution may be performed continuously during a gas purification process. Alternatively, wash solution may be withdrawn discontinuously, i.e. in separate operative steps which may be repeated any desired number of times.

The above embodiments of the first aspect are generally referred to as recycling embodiments.

In one embodiment, referred to herein as the combined embodiment, intercooling is performed in addition to steps a)-d). In this embodiment, a second withdrawal of wash solution enriched with acidic gases may be performed at a second withdrawal level. Similar to the first withdrawal, wash solution withdrawn at the second withdrawal level is cooled and reintroduced to the wash solution stream. However, reintroduction is made at a second reintroduction level which corresponds to the second withdrawal level. Consequently, the second withdrawal and reintroduction could be seen as an intermediate step in the acidic gas absorption process.

Thus, in one example of the combined embodiment, there is provided a process further comprising the steps of
   b1) withdrawing wash solution enriched with acidic gases from said wash solution stream at a second withdrawal level;
   c1) cooling said withdrawn wash solution stream; and
   d1) reintroducing said cooled wash solution to said wash solution stream at a second reintroduction level corresponding to said second withdrawal level.

Step b1) of the process may comprise withdrawal of the entire wash solution stream, i.e. 100% of said wash solution stream. Alternatively, the ratio of withdrawn wash solution is 10-90% of said wash solution stream, such as 30-70% of said wash solution stream.

Furthermore, in examples of the combined embodiment, said second withdrawal of wash solution is preferably performed independently of the first withdrawal. Thus, the second withdrawal may be performed at the same level as the first withdrawal, or at the same level as the first reintroduction, or at any other level of the wash solution stream enabling withdrawal of wash solution enriched with acidic gases. In one embodiment, said second reintroduction level in step d1) corresponds to said first reintroduction level in step d). When the first and second reintroduction levels corresponds to each other, wash solution from the first and second withdrawal level is preferably commonly reintroduced to the wash solution stream, such as via the same line.

Irrespective of where withdrawals and reintroductions of wash solution are made, cooling of wash solution coming from the first and second withdrawal may be performed in a common step. Thus, cooling of the withdrawn wash solution in step c) and c1) may be performed as a common operation or as two separate operations.

In another example of said combined embodiment, there is provided a process wherein said second withdrawal level in step b1) corresponds to said first withdrawal level in step b). Thus, withdrawal of wash solution for recycling and withdrawal for intercooling may be performed simultaneously in a common operation. Thereafter, withdrawn wash solution is cooled and split into two portions, the first of which is reintroduced to the wash solution stream at the same level from where it was withdrawn. The ratio of wash solution withdrawn from the wash solution stream is for example 30-100% of said wash solution stream, such as 30-70% of said wash solution stream. In one embodiment, the entire wash solution stream, i.e. 100%, is withdrawn, cooled and split into two portions before being reintroduced to the stream and brought into contact with the gas stream. The portion of cooled wash solution being reintroduced to the wash solution stream at the same level from where it was withdrawn, i.e. the second reintroduction level, is for example 10-90% of said cooled wash solution, preferably 30-70% of said cooled wash solution, preferably 40-60% of said cooled wash solution, preferably about 50% of said cooled wash solution.

In the aspect described above, wash solution withdrawn from the wash solution stream is cooled before being reintroduced to the wash solution stream. It is understood that withdrawn wash solution may be cooled in a cooling unit suitable for cooling liquid components, for example to a temperature of 20-70° C., such as a temperature of 35-50° C.

Alkaline compounds are conventionally used in acidic gases capture processes. Examples of alkaline compounds include, but are not limited to, ammonia and amine compounds such as monoethanolamine (MEA), diethanolamine (DEA), methyldiethanolamine (MDEA), diisopropylamine (DIPA) and aminoethoxyethanol (diglycolamine) (DGA). The most commonly used amines compounds in industrial plants are the alkanolamines MEA, DEA, MDEA and blends thereof. It is understood that the wash solution stream used in the first aspect of the inventive acidic gas removal process may comprise any of the above mentioned alkaline compounds. In the first aspect as described above, the wash solution stream may for example comprise an amine compound, such as an amine selected from a primary amine, a secondary amine, a tertiary amine or a blend thereof.

In the inventive process of the first aspect, a gas stream to be purified is contacted with a wash solution stream. Said purification of the gas stream, i.e. removal of acidic gases from said gas stream, may be performed in an absorption unit, such as a packed bed column. When gas purification is performed in an absorption unit, wash solution enriched with acid gases may be withdrawn from anywhere on the absorption unit. Wash solution may for example be withdrawn from a redistribution vessel between two sections of packing and/or from a collector tray at the bottom of the absorption unit. The absorption unit may preferably be arranged for operation in counter current flow mode. Thus, step a) may be performed in a counter current flow mode.

Features mentioned above, in respect of the first aspect of the invention, may also be applicable to some or all embodiments of further aspects of the invention described hereinbelow.

In another aspect, there is provided a gas purification system for removal of acidic gases from a gas stream, comprising:
   an absorption unit arranged for receiving a gas stream and contacting it with a wash solution stream; and
   a cooling unit in fluid communication with the absorption unit,
   wherein the cooling unit receives wash solution enriched with acidic gases from a first withdrawal level of said absorption unit, cools the enriched wash solution, and provides cooled, enriched wash solution to a first reintroduction level of the absorption unit upstream of the withdrawal level.

The advantages mentioned in respect of the inventive process are similarly achieved by the inventive system as described here. Thus, the inventive system enables increased loading of acidic gases, i.e. increased absorption of acidic gases in the wash solution stream, and decreased energy consumption as compared to a conventional system, such as an amine-based system for $CO_2$ capture.

In the absorption unit of the gas purification system, a gas stream comprising acidic gases are contacted with a wash solution stream. Acidic gases are absorbed in the wash solution stream to provide a wash solution stream enriched with acidic gases. The cooling unit is in fluid communication with the absorption unit in that it may receive wash solution from and recirculate wash solution to the absorption unit. Thus, the cooling unit receives wash solution enriched with acidic gases withdrawn from the absorption unit at a first withdrawal level. The portion withdrawn wash solution which is received by the cooling unit is for example 10-90% of the total wash solution stream, such as 30-70% of the total wash solution stream. Enriched wash solution received by the cooling unit is cooled, e.g. to a temperature of 20-70° C., such as a temperature of 35-50° C. Cooled, enriched wash solution is reintroduced to the absorption unit at a first reintroduction level being upstream of the withdrawal level.

In an embodiment of the gas purification system, the cooling unit of said system further receives wash solution enriched with acidic gases from a second withdrawal level of said absorption unit, and provides cooled, enriched wash solution to a second reintroduction level corresponding to the second withdrawal level of the absorption unit. Thus, cooled, enriched wash solution is reintroduced to the absorption unit at the same level from where it was withdrawn.

It is understood that the inventive system may be used for removal of any undesired acidic gas component from a gas stream, said acidic gases may e.g. be selected from the group consisting of $CO_2$ and $H_2S$. The acidic gas components are absorbed in a wash solution stream. As discussed above, alkaline compounds are commonly used in conventional capture processes. Thus, the wash solution stream used in the inventive system may comprise an alkaline compound such as an amine compound.

As the skilled person will understand, any type of absorber unit arranged for bringing a gas stream into contact with a wash solution stream may be used. One example of an absorption unit is a packed bed column.

DETAILED DESCRIPTION

Specific embodiments of systems and processes for removal of acidic gases according to the invention are described below with reference to the drawings.

Figure 1:
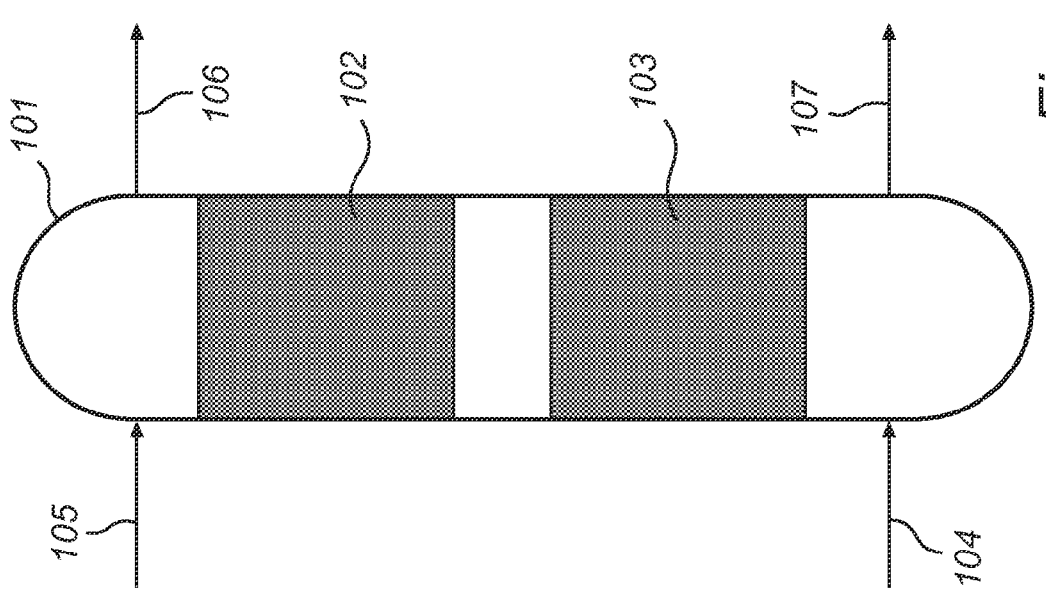
FIG. 1 is a diagram generally depicting a known amine-based gas purification system.

FIG. 1 is a schematic representation of a conventional amine-based $CO_2$ capture process. In the amine-based $CO_2$ capture process, an absorption unit (101) is arranged to allow contact between a gas stream to be purified and an amine-based wash solution. The absorption unit comprises two absorption sections, an upper section (102) and a bottom section (103). Flue gas from which $CO_2$ is to be removed enters the bottom section of the absorption unit (101) via line (104). In the absorption sections of the unit, flue gas is contacted with an amine-based wash solution. The amine-based wash solution is fed to the upper part of the absorption unit via line (105). In the $CO_2$ absorption unit (101), $CO_2$ from the flue gas is chemically absorbed in the wash solution. Flue gas depleted of $CO_2$ leaves the $CO_2$ absorption unit at the upper part of the unit via line (106). Used wash solution comprising absorbed $CO_2$ leaves the absorption unit at the bottom part of the unit via line (107). The $CO_2$ rich wash solution leaving the absorption unit may be recycled in a regenerator where $CO_2$ is separated from the wash solution to produce a "lean" amine-based wash solution for reuse in $CO_2$ absorption.

Figure 2:
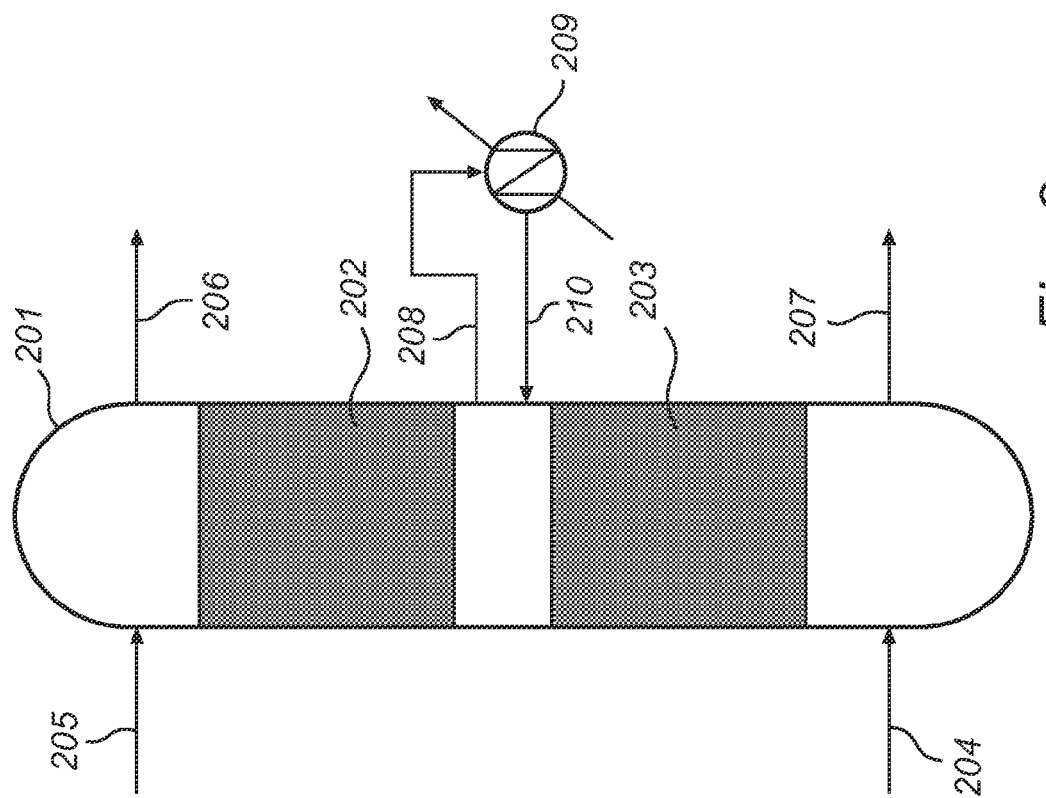
FIG. 2 is a diagram generally depicting a known amine-based gas purification system.

FIG. 2 is a schematic representation of a previously described gas purification system. The system comprises a $CO_2$ absorption unit (201), arranged to allow contact between a gas stream comprising $CO_2$ and an amine-based wash solution stream. The absorption unit comprises two absorption sections, an upper section (202) and a bottom section (203). Flue gas from which $CO_2$ is to be removed is fed to the bottom part of the absorption unit via line (204) and enters the bottom section of the unit. Wash solution is fed to the upper part of the absorption unit via line (205) and enters the upper section of the unit. When contacted with the flue gas, the wash solution stream absorbs $CO_2$ from the flue gas. Flue gas depleted of $CO_2$ leaves the $CO_2$ absorption unit at the upper part of the unit via line (206). Used wash solution rich in absorbed $CO_2$ leaves the absorption unit at the bottom part of the unit via line (207). The $CO_2$ rich wash solution may be recycled in a regenerator where $CO_2$ is separated from the wash solution.

The system of FIG. 2 further comprises means for intermediate cooling of the entire wash solution stream. Semi-rich wash solution coming from the upper section (202) of the absorption unit (201) is withdrawn from the absorption unit via line (208). The wash solution is cooled in cooling unit (209) and reintroduced to the bottom section (203) of the absorption unit via line (210).

In embodiments thereof, the inventive gas purification system as described herein may comprise an absorption unit to allow contact between a gas stream containing $CO_2$ to be removed and a wash solution stream. Said absorption unit may be arranged as a plurality of vessels or operational steps in parallel or in series. Said absorption unit may comprise one or more absorption sections, such as 1-10 absorption sections, preferably 2-8 sections. Each section may comprise mass transfer devices, such as packing or trays, to allow for absorption of $CO_2$ in the wash solution stream.

A gas stream, e.g. flue gas, comprising acidic gases to be removed is fed to the absorption unit. In the absorption unit the gas stream is contacted with a wash solution stream, e.g. by bubbling the flue gas through said wash solution or by spraying the wash solution into the gas stream. In the absorption unit, acidic gases from the gas stream are absorbed in the wash solution stream. The acidic gases to be removed may be any acidic gases, such as $CO_2$, COS or $H_2S$.

Wash solution is fed to the upper part of the absorption unit, or optionally, the upper section of the absorption unit. A stream of said wash solution is contacted with the gas stream, e.g. in counter current flow mode, in the absorption unit. Different compositions of wash solutions for use in the inventive process and system may be considered. Said wash solution stream may be an aqueous solution comprising an amine compound. One example of a wash solution stream is an aqueous solution comprising an alkanolamine like solvent.

In all embodiments, the gas purification system as described herein further comprises means for withdrawing wash solution enriched with acidic gases from the stream of wash solution in the absorption unit. Thus, when contacting the wash solution stream with the gas stream, acidic gases are absorbed in the wash solution. Subsequently, wash solution is withdrawn from the wash stream at a first withdrawal level. It is understood that wash solution can be withdrawn at any level of the wash solution stream. If the absorption unit for example comprises sections where absorption of acidic gases in the wash solution stream may take place, wash solution may be withdrawn after the first section, after the last section, or after any other section. Withdrawn wash solution is enriched with acidic gases, i.e. it comprises a larger amount of absorbed acidic gases compared to the wash solution stream upstream of the withdrawal level. It may e.g. be partly enriched with acidic gases to form a semi-rich wash solution or it may be fully enriched with acidic gases to form a rich wash solution.

Figure 3:
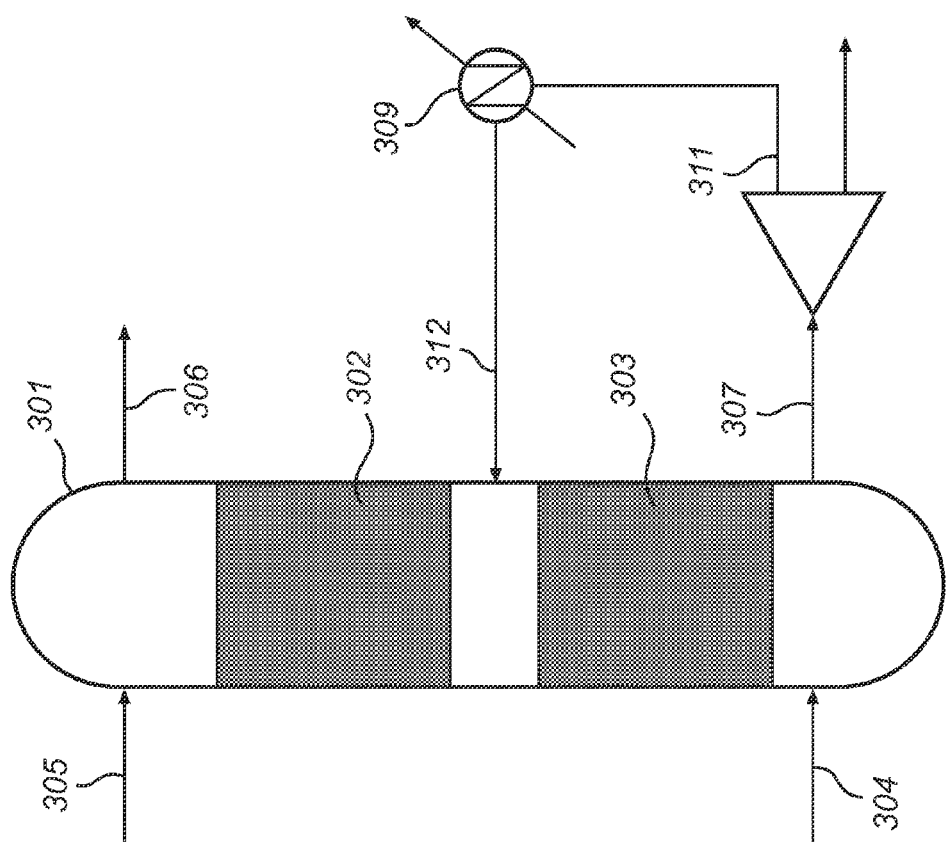
FIG. 3 is a diagram generally depicting a recycling embodiment of the inventive gas purification system.

FIG. 3 is a schematic representation of an embodiment of the inventive gas purification system. The system comprises a $CO_2$ absorption unit (301) arranged to allow contact between a gas stream comprising $CO_2$ to be removed and a wash solution stream. The absorption unit comprises two absorption sections, an upper section (302) and a bottom section (303). The two sections comprise mass transfer devices to allow for $CO_2$ absorption in the wash solution. A gas stream, e.g. flue gas, is fed to the bottom part of the absorption unit via line (304). In the absorption unit, flue gas is contacted with e.g. an amine-based wash solution stream. The wash solution is fed to the upper part of the absorption unit via line (305). In the $CO_2$ absorption unit (301), $CO_2$ from the flue gas is absorbed in the wash solution. Flue gas depleted of $CO_2$ leaves the $CO_2$ absorption unit at the upper part of the absorption unit via line (306).

Used wash solution rich in absorbed $CO_2$ leaves the absorption unit at the bottom part of the absorption unit via line (307) and is separated into two portions. The first portion, e.g. 50% of the total stream, of $CO_2$-rich wash solution is via line (311) sent to a cooling unit (309). Wash solution cooled to a temperature of e.g. 40° C. is reintroduced to the wash solution stream between the two sections of the absorption unit at a reintroduction level (312) which is upstream of the withdrawal level. By reintroducing a comparatively cool and $CO_2$-rich wash solution into the semi-rich wash solution stream in the absorption unit, the overall temperature of the wash solution mix is lowered. The second portion of $CO_2$-rich wash solution may be sent to a regenerator for separating $CO_2$ from the wash solution.

Figure 4:
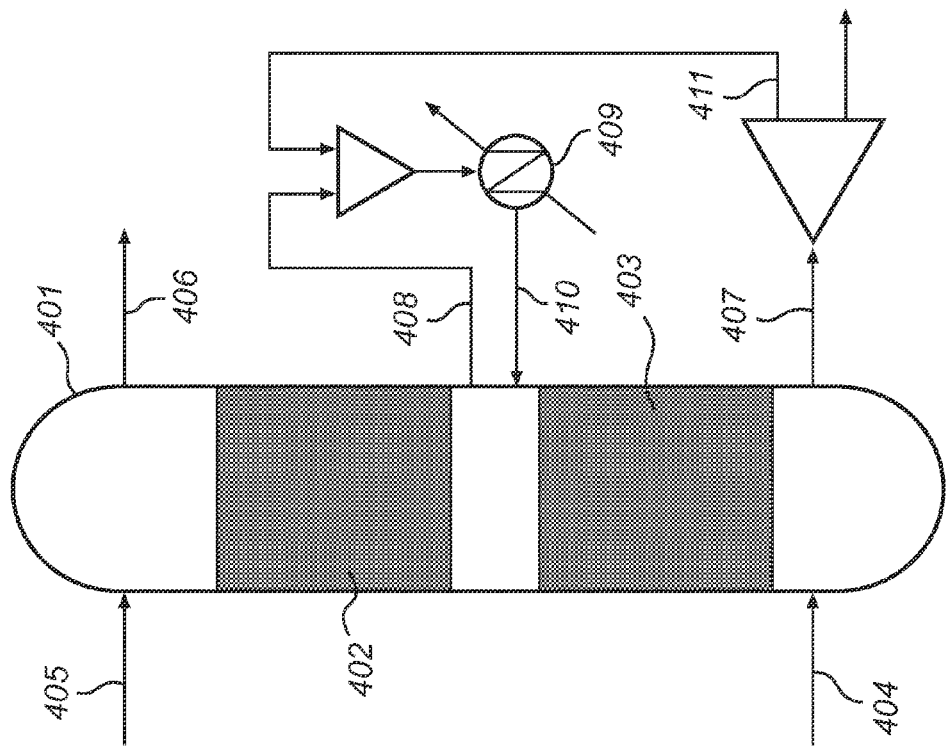
FIG. 4 is a diagram generally depicting a combined recycling and intercooling embodiment of the inventive gas purification system.

FIG. 4 is a schematic representation of an embodiment of the inventive gas purification system. The system comprises a $CO_2$ absorption unit (401) arranged to allow contact between a gas stream comprising $CO_2$ to be removed and a wash solution stream. Compared to the system as represented by FIG. 3, the absorption unit of FIG. 4 similarly comprises two sections which allow for absorption of $CO_2$ into the wash solution stream. Flue gas, from which $CO_2$ is to be removed, is fed to the bottom part of the absorption unit via line (404) and enters the bottom section (403) of the absorption unit. In the absorption unit, flue gas is contacted with a wash solution stream, such as an amine-based wash solution. The wash solution is fed to the upper part of the absorption unit via line (405) and enters the upper section (402) of the unit. When $CO_2$ is absorbed in the wash solution stream, the wash solution becomes enriched with $CO_2$. Flue gas depleted of $CO_2$ leaves the $CO_2$ absorption unit at the upper part of the absorption unit via line (406).

Used wash solution rich in absorbed $CO_2$ leaves the absorption unit at the bottom part of the absorption unit via line (407) and is separated into two portions. The first portion of $CO_2$-rich wash solution is via line (411) transferred to a cooling unit (409) and is subsequently recirculated back to the absorption unit. This first portion may for example comprise 50% of the total wash solution stream leaving the absorption unit. Cooled wash solution is reintroduced to the wash solution stream at a first reintroduction level (410) between the two sections of the absorption unit. Thus, the portion of $CO_2$-rich and cooled wash solution withdrawn from the bottom of the absorption unit is reintroduced to the wash solution stream entering the bottom section of the unit. The reintroduction level is upstream of the wash solution withdrawal level.

The second portion of $CO_2$-rich wash solution may be sent to a regenerator for separating $CO_2$ from the wash solution.

Moreover, a second withdrawal of wash solution from the inventive system in FIG. 4 is performed. Semi-rich wash solution, i.e. wash solution enriched with $CO_2$ but having capacity of absorbing more $CO_2$, is withdrawn from the absorption unit (401) via line (408) at a second withdrawal level. The entire wash solution stream is preferably withdrawn from the absorption unit. Following withdrawal of wash solution, wash solution is cooled in a cooling unit (409) and reintroduced to the absorption unit at a second reintroduction level, being the same as the second withdrawal level. The second withdrawal of wash solution is combined with the first portion of $CO_2$-rich wash solution coming from the bottom of the absorption unit via line (411). The first portion of rich wash solution and the second withdrawal of semi-rich wash solution is combined, cooled in cooling unit (409) and jointly reintroduced and thus fed to the bottom section of the absorption unit via line (410). The combined wash solution is cooled, e.g. to a temperature of about 40° C., in the cooling unit (409).

Figure 5:
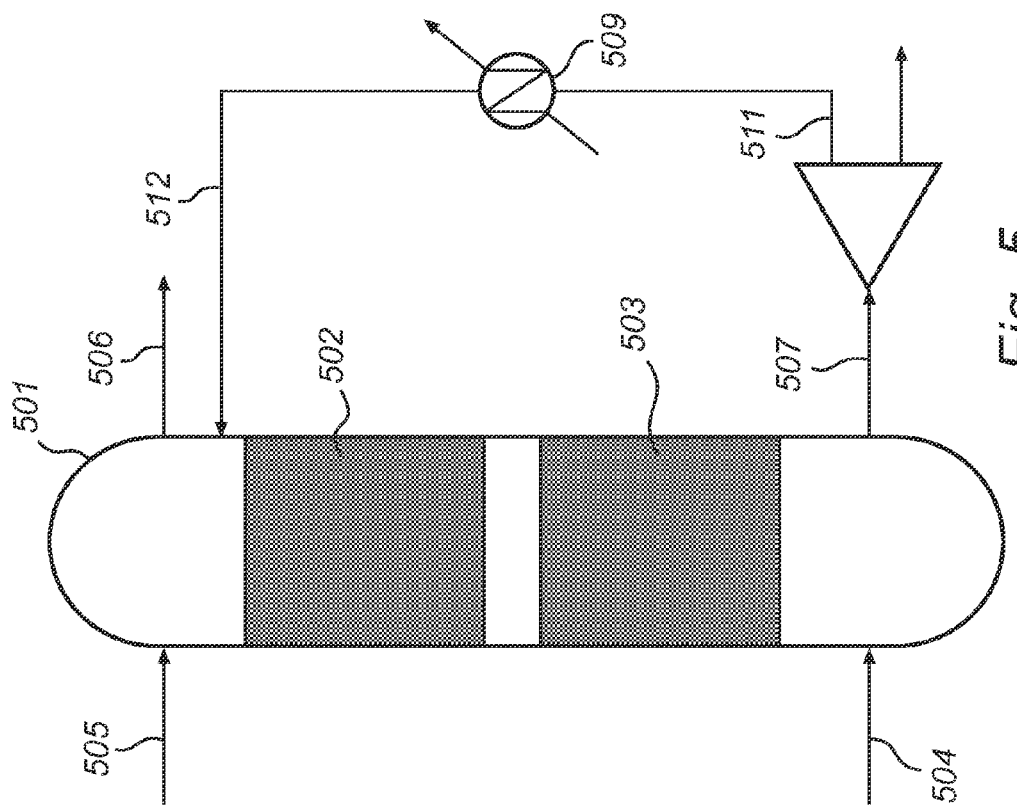
FIG. 5 is a diagram generally depicting a recycling embodiment of the inventive gas purification system.

FIG. 5 is a schematic representation of an embodiment of the inventive gas purification system. The system is similar to the system represented by FIGS. 3 and 4 in that it comprises a $CO_2$ absorption unit (501), which in turn comprises an upper section (502) and a bottom section (503). Flue gas from which $CO_2$ is to be removed is fed to the bottom part of the absorption unit via line (504). Flue gas is contacted with the wash solution stream in the absorption unit. The wash solution, which may comprise an amine compound, is fed to the upper part of the absorption unit via line (505). $CO_2$ from the flue gas is absorbed in the wash solution stream. The resulting flue gas depleted of $CO_2$ leaves the $CO_2$ absorption unit at the upper part of the absorption unit via line (506) while used wash solution rich in absorbed $CO_2$ leaves the absorption unit at the bottom part of the absorption unit via line (507). The used wash solution leaving the system is split into two portions, the first of which is sent to a cooling unit (509) via line (511). Said first portion of $CO_2$-rich wash solution may for example comprise 50% of the total wash solution stream leaving the absorption unit. In the cooling unit (509), the first portion of $CO_2$-rich wash solution is cooled, e.g. to a temperature of about 40° C.

The cooled wash solution is subsequently reintroduced to the wash solution stream at the upper part of the absorption unit via line (512). Thus, the cooled wash solution rich in $CO_2$ is reintroduced to the wash stream at a first reintroduction level which is upstream of the level from which it was withdrawn.

The second portion of the used wash solution may be sent to a regenerator for separating $CO_2$ from the wash solution to produce a lean wash solution.

Figure 6:
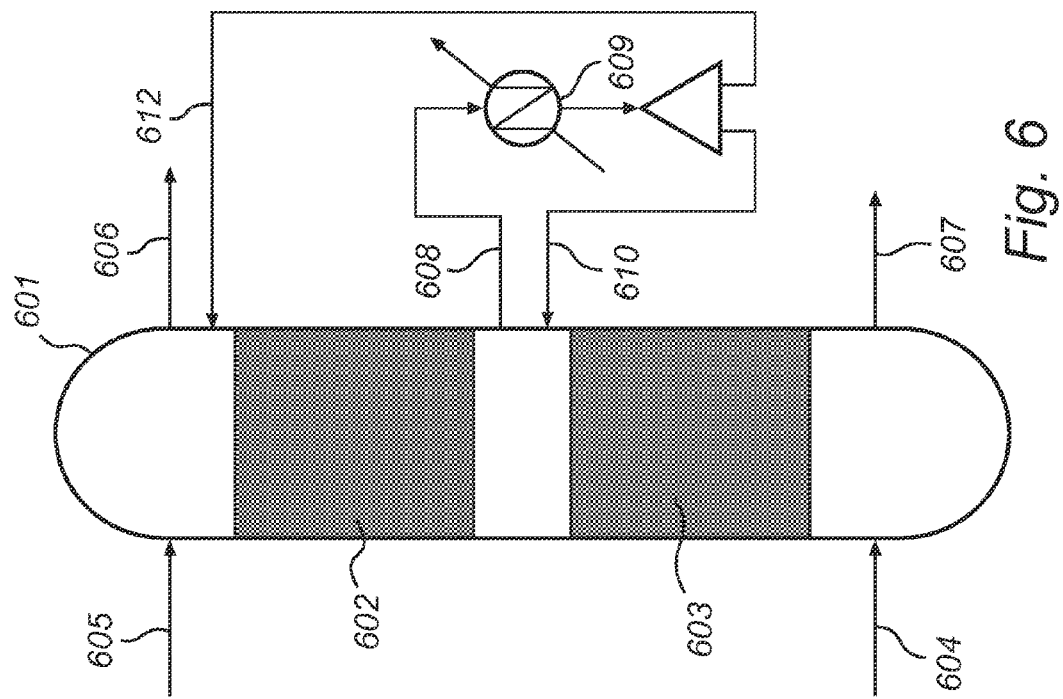
FIG. 6 is a diagram generally depicting a combined recycling and intercooling embodiment of the inventive gas purification system.

FIG. 6 is a schematic representation of an embodiment of the inventive gas purification system. The system comprises a $CO_2$ absorption unit (601) which is arranged to allow contact between a gas stream and a wash solution stream. This example of an absorption unit comprises two absorption sections, an upper section (602) and a bottom section (603) which may comprise any suitable type of mass transfer devices for enabling $CO_2$ absorption into the wash solution. Flue gas from which $CO_2$ is to be removed is fed to the bottom part of the absorption unit via line (604). In the absorption unit, flue gas is contacted with the wash solution stream. The wash solution, which may comprise an amine compound, is fed to the upper part of the absorption unit via line (605) and enters the upper section (602). In the $CO_2$ absorption unit (601), $CO_2$ from the flue gas is absorbed in the wash solution, to form a wash solution stream enriched with $CO_2$. Flue gas depleted of $CO_2$ leaves the $CO_2$ absorption unit at the upper part of the absorption unit via line (606). Used wash solution rich in absorbed $CO_2$ leaves the absorption unit at the bottom part of the absorption unit via line (607) and may be sent to a regenerator for separating $CO_2$ from the wash solution.

Wash solution enriched with $CO_2$ coming from the upper section (602) of the absorption unit in FIG. 6 is withdrawn from the absorption unit via line (608). The entire wash solution stream may be withdrawn. Wash solution is cooled in cooling unit (609), preferably to a temperature of about 40° C., and split into two portions. The first of the two portions, which may comprise about 50% of the total wash solution stream, is via line (612) recycled back to the absorption unit at a reintroduction level located upstream of the withdrawal level.

The second portion of the semi-rich wash solution is via line (610) reintroduced to the absorption unit and fed to the bottom section (603) of the absorption unit. Thus, the second portion of wash solution is reintroduced at a second reintroduction level corresponding to the first withdrawal level.

EXAMPLES

Example 1

Simulation of $CO_2$ Removal from Flue Gas

Four different example processes for $CO_2$ removal from flue gas were simulated and compared to previously known processes. In particular, rich loading and energy consumption for the different processes were studied.

The simulations were done for a conventional amine-based capture flow scheme, comprising an absorption unit, a heat exchanger and a regenerator with a reboiler. The simulated process parameters for all processes are shown in Table 1, as well as the mole absorbed $CO_2$ per mole wash solution and the reduction in energy consumption. If nothing else is stated, the different operative units were assumed to be operated conventionally. In all example processes, the liquid circulation rate was set to 44000 Gpm. Other circulation rates may also be explored, and there might be an optimum circulation rate for each specific case. The temperature of the incoming "lean" wash solution stream was 40° C., and the temperature of the wash solution being reintroduced to the wash solution stream was similarly set to 40° C. The simulations were performed for a packed bed column comprising two sections. For all cases, a 90% $CO_2$ removal was assumed. The simulations were done using an in-house rate-based simulator.

The first process, referred to as process 1, was a conventional amine-based $CO_2$ capture process as generally represented by FIG. 1. An aqueous alkanolamine solution was used as wash solution and the average energy consumption for the process was approximately 3-4 GJ/tonne of captured $CO_2$.

The second process was included in the simulation experiment for comparative purposes. This process is generally represented by the system of FIG. 2. In this case, the entire wash solution stream coming out of the upper section of the absorption unit was cooled and fed to the bottom section of the absorption unit. This process increases the rich loading by approximately 20% and reduces the energy consumption by approximately 11% when compared to the conventional process of process 1.

The third process is generally represented by the system of FIG. 3. In this case, 50% of the wash solution stream enriched with $CO_2$ leaving the bottom of the absorption unit was sent back to the bottom section of the absorption unit via a cooling unit. This process increases the rich loading by approximately 7%, and reduces the energy consumption by approximately 5%, when compared to conventional process of process 1.

The fourth process is generally represented by the system of FIG. 4. In this case, 50% of the wash solution stream enriched with $CO_2$ coming out of the bottom of the absorption unit was sent back to the top of the bottom section via a cooling unit. In addition, the entire wash solution stream coming out of the upper section of the absorber packing bed was cooled and mixed along with the recycled wash solution stream coming from the bottom section of the absorption unit. This process increases the rich loading by approximately 27% and reduces the energy consumption by approximately 18% when compared to process 1.

The fifth process is generally represented by the system of FIG. 5. In this case, 50% of the $CO_2$ enriched wash solution stream coming from the bottom of the absorption unit was sent to the upper section of the absorption unit via a cooling unit. This process increases the rich loading by approximately 4% and reduces the energy consumption by approximately 2% when compared to the conventional process of process 1.

The sixth process is generally represented by the system of FIG. 6. In this case, 50% of the semi-rich wash solution coming from the upper section of the absorption unit was sent back to the upper section of the absorption unit via a cooling unit. The other portion of the semi-rich wash solution stream coming from the upper section is sent to the bottom section via a cooling unit. This process increases the rich loading by approximately 22% and reduces the energy consumption by approximately 15% when compared to the conventional process of process 1.

Consequently, all simulated model processes were found to increase the loading and reduce the energy consumption compared to a conventional process. It was moreover found that even a small increase in the rich loading downstream of the absorption unit has a significant impact on the energy consumption of the overall process.

TABLE 1

Comparisons of rich loading and energy requirements for different cases

| Process | Solvent circulation rate (Gpm) | $CO_2$ removed (lb/hour) | Reboiler duty (Btu/lb) | Reboiler duty (Gj/tonne) | Lean loading (mole/mole) | Rich loading (mole/mole) | Reduction % |
|---|---|---|---|---|---|---|---|
| 1 | 44000 | 1266850 | 1476 | 3.432 | 0.018 | 0.311 | N/A |
| 2 | 44000 | 1275360 | 1313 | 3.054 | 0.090 | 0.375 | 11.025 |
| 3 | 44000 | 1270790 | 1409 | 3.275 | 0.043 | 0.333 | 4.575 |

TABLE 1-continued

Comparisons of rich loading and energy requirements for different cases

| Process | Solvent circulation rate (Gpm) | $CO_2$ removed (lb/hour) | Reboiler duty (Btu/lb) | Reboiler duty (Gj/tonne) | Lean loading (mole/ mole) | Rich loading (mole/ mole) | Reduction % |
|---|---|---|---|---|---|---|---|
| 4 | 44000 | 1274120 | 1217 | 2.828 | 0.114 | 0.396 | 17.585 |
| 5 | 44000 | 1270870 | 1448 | 3.366 | 0.082 | 0.324 | 1.915 |
| 6 | 44000 | 1269170 | 1261 | 2.931 | 0.167 | 0.038 | 14.594 |

The invention claimed is:

1. A process of removal of acidic gases from a gas stream, comprising the steps of
    a) contacting a wash solution stream with said gas stream containing acidic gases to be removed to allow absorption of the acidic gases into the wash solution stream;
    b) withdrawing wash solution enriched with acidic gases from said wash solution stream at a first withdrawal level;
    c) cooling said withdrawn wash solution; and
    d) reintroducing said cooled wash solution to the wash solution stream at a first reintroduction level to form a mixed wash solution stream, said first reintroduction level being upstream of said first withdrawal level;
    the process further comprising the steps of:
    b1) withdrawing wash solution enriched with acidic gases from said wash solution stream at a second withdrawal level;
    c1) cooling said withdrawn wash solution stream; and
    d1) reintroducing said second cooled wash solution to said wash solution stream at a second reintroduction level corresponding to said second withdrawal level; and
    wherein said second reintroduction level in step d1) corresponds to said first reintroduction level in step d).

2. A process according to claim 1, wherein in step b) a ratio of withdrawn wash solution is 10-90% of the total wash solution stream.

3. A process according to claim 1, wherein in step b1) the ratio of withdrawn wash solution is selected from 100% of said wash solution stream and 30-70% of said wash solution stream.

4. A process according to claim 1, wherein said second withdrawal level in step b1) corresponds to said first withdrawal level in step b).

5. A process according to claim 4, wherein the a ratio of wash solution being reintroduced at the second reintroduction level said is 10-90% of the wash solution withdrawn in step b) and b1).

6. A process according to claim 1, wherein said wash solution is cooled to a temperature of 20-70° C.

7. A process according to claim 1, wherein said acidic gases are selected from the group consisting of $CO_2$ and $H_2S$.

8. A process according to claim 1, wherein said wash solution stream comprises an amine compound.

9. A process according to claim 1, wherein said removal takes place in an absorption unit.

10. A process according to claim 1, wherein step a) is performed in a counter current flow mode.

11. A process according to claim 1 wherein in step b) a ratio of withdrawn wash solution is 30-70% of the total wash solution stream.

12. A process according to claim 4, wherein the a ratio of wash solution being reintroduced at the second reintroduction level said is 30-70% of the wash solution withdrawn in step b) and b1).

13. A process according to claim 1, wherein said wash solution is cooled to a temperature of 35-50° C.

* * * * *